US005726240A

United States Patent [19]

Rosthauser et al.

[11] Patent Number: 5,726,240
[45] Date of Patent: Mar. 10, 1998

[54] REACTIVITY STABILIZATION OF POLYMETHYLENE POLY (PHENYLISOCYANATES)

[75] Inventors: James W. Rosthauser, Glendale; Robert L. Cline, Paden City; Richard S. Pantone, New Martinsville, all of W. Va.

[73] Assignee: Bayer Corporation, Pittsburgh, Pa.

[21] Appl. No.: 755,925

[22] Filed: Nov. 25, 1996

[51] Int. Cl.[6] .............................. C08K 3/00; C08K 3/20; C08L 75/00; C07C 249/00
[52] U.S. Cl. ................. 524/590; 252/182; 252/182.2; 252/182.21; 252/182.22; 252/182.29; 524/107; 524/109; 524/114; 560/331
[58] Field of Search .......................... 524/590, 107, 524/114, 109; 252/182, 182.2, 182.21, 182.22, 182.29; 560/331

[56] References Cited

U.S. PATENT DOCUMENTS

| | | | |
|---|---|---|---|
| 2,885,420 | 5/1959 | Spiegler | 260/453 |
| 3,793,362 | 2/1974 | Kolakowski et al. | 260/453 SP |
| 3,919,166 | 11/1975 | Brachman | 260/45.8 A |
| 3,925,437 | 12/1975 | Rowton | 260/453 SP |
| 3,969,288 | 7/1976 | Cenker et al. | 260/2.5 BF |
| 4,118,286 | 10/1978 | Burns et al. | 203/89 |
| 4,310,688 | 1/1982 | Mendoza | 560/222 |
| 4,661,627 | 4/1987 | Regelman | 560/352 |
| 4,677,154 | 6/1987 | Narayan et al. | 524/710 |
| 4,775,558 | 10/1988 | Haas et al. | 427/373 |
| 4,814,103 | 3/1989 | Potter et al. | 252/182.22 |
| 4,904,704 | 2/1990 | Nafziger et al. | 521/156 |
| 5,208,368 | 5/1993 | Scherzer et al. | 560/333 |
| 5,258,417 | 11/1993 | Narayan | 521/160 |

FOREIGN PATENT DOCUMENTS 1465014   2/1977   United Kingdom .

*Primary Examiner*—Patrick Niland
*Attorney, Agent, or Firm*—Joseph C. Gil; N. Denise Brown

[57] ABSTRACT

This invention relates to mixtures of polymethylene poly (phenylisocyanate) blends with epoxides. The addition of the epoxide stabilizes the reactivity of the polyisocyanate blends such that it is no longer dependent on the acidity. It is now possible to form polyurethanes from these mixtures based on polymethylene poly(phenylisocyanate) blends wherein less catalyst is necessary.

9 Claims, 3 Drawing Sheets

VISCOSITY VS TIME

REACTIVITY STABILIZATION OF POLYMETHYLENE POLY (PHENYLISOCYANATES)

BACKGROUND OF THE INVENTION

This invention relates to a mixture of polymethylene poly(phenylisocyanate) blends with epoxides. The present invention also relates to a process for producing polyurethanes/ureas by reacting these mixtures with isocyanate-reactive components.

Various blends of isocyanates are known in the field of polyurethane chemistry. A component may be blended with an isocyanate to improve a particular characteristic such as, for example, the color. Organic isocyanates are known to discolor over time. These are, in general, colorless liquids or solids and change from light yellow to brown after as little as a few hours. Different stabilizer packages to prevent discoloration of various isocyanates, including toluene diisocyanates and diphenylmethane diisocyanates and pre-polymers thereof, are known and described in, for example, U.S. Pat. Nos. 2,885,420, 4,677,154 and 4,814,103, as well as in GB 1,465,014.

U.S. Pat. No. 2,885,420 describes stabilizing agents which can be added to organic isocyanates in quantities of from 0.01% to 0.5% by weight. These stabilizing agents are essentially colorless compounds of the following group: aliphatic, aromatic and cycloaliphatic ethers and thioethers and mixtures of this group of compounds. These compounds are essentially non-reactive with organic isocyanates under ordinary atmospheric conditions and/or react slowly in the absence of a catalyst. This group of compounds stabilizes the organic isocyanates against discoloration even in the presence of oxygen, moisture or light.

U.S. Pat. No. 4,677,154 describes a stabilizer package comprising 2,6-di(t-butyl)-p-cresol (BHT) and a second compound may be added to a thermoplastic polyurethane reaction mixture in quantities of from 0.01 to 1% weight, based on the weight of the isocyanate, to eliminate discoloration. The second compound of the stabilizer package is selected from various phosphite, diphosphonites, substituted phenols, etc. The reaction mixture also comprises 4,4'-methylene diphenyl diisocyanate, a polyol selected from the group consisting of polyester polyols and polyoxyalkylene polyether polyols, and a short chain extender. This stabilizer package is suitable for use to prevent discoloration of polyurethanes based on various isocyanates including aliphatic, cycloaliphatic, arylaliphatic and aromatic isocyanates, including polymeric polyisocyanates such as polymethylene poly(phenylene polyisocyanate).

Similarly, U.S. Pat. No. 4,814,103 describes the use of BHT and aliphatic epoxides to prevent discoloration of prepolymers based on monomeric MDI, especially MDI with a high 2,4'-monomer content.

A process for improving the storage stability of diphenylmethane diisocyanates is also described in GB 1,465,014. This process comprises storing refined diphenylmethane diisocyanate in intimate admixture with glycidol. Suitable diphenylmethane diisocyanates include the 2,2'-isomer, the 2,4'-isomer and the 4,4'-isomer, and mixtures thereof. It is also possible that trace quantities of related triisocyanates such as, for example, 2,4'-di-(p-isocyanobenzyl)phenyl isocyanate as well as other impurities such as ureas, carbodiimides, uretonimines, etc. are present in minimal amounts. The quantity of glycidol is typically from 0.001 to 0.25% by weight of the isocyanate. It is also possible that glycidol be used in combination with an organic solvent such as, for example, toluene, dimethyl phthalate, acetone, etc. The isocyanate can be dissolved in the solvent, the glycidol added to that solution and the solvent removed, or the glycidol can be added to the diisocyanate as a solution in a small amount of an inert solvent.

All of these patents are directed to stabilization of polyurethane compounds against discoloration. Most polymeric MDI mixtures are highly colored when they are manufactured. In fact, many of these products are residues and thus, the reproducibility and standardization of these polymeric MDI blends is cumbersome.

According to the present invention, it is now possible to stabilize the reactivity of polymethylene poly (phenylisocyanate) blends by the addition of an epoxide. The reactivity of polymethylene poly(phenylisocyanate) blends is known to vary with the acidity. It has now been discovered that adding a small quantity of an epoxide to a polymethylene poly(phenylisocyanate) blend increases and stabilizes the reactivity such that it no longer varies significantly with the acidity of the polyisocyanate blend. This makes it possible to use a smaller quantity of catalyst, which in turn reduces the cost of using polymethylene poly (phenylisocyanate) blends in polyurethane formulations. It also results in polyurethanes/ureas produced from these polyisocyanate blends having improved properties, including service life of the resulting polyurethane/urea articles

SUMMARY OF THE INVENTION

This invention relates to a mixture of a) 90 to 99.5% by weight, based on 100% by weight of the mixture, of polymethylene poly(phenylisocyanate) blends and b) 0.5 to 10% by weight, based on the entire weight of the mixture, of one or more epoxides having an epoxide equivalent weight of about 44 to about 400. The polymethylene poly (phenylisocyanate) blend has a functionality of from about 2.1 to about 3.5, an NCO group content of from about 30% to about 33%, and a monomer content of from about 30% to about 90% by weight, wherein the content of monomer comprises from about 0 to about 5% by weight of the 2,2'-isomer, from about 1to 20% by weight of the 2,4'-isomer, and from about 25 to about 65% by weight of the 4,4'-isomer, based on the entire weight of the blend.

The present invention also relates to a process for producing polyurethanes/ureas by reacting these 1) mixtures of a) polymethylene poly(phenylisocyanate) blends and b) epoxides, with 2) isocyanate-reactive components, by the polyisocyanate polyaddition process.

These mixtures of a) polymethylene poly (phenylisocyanate) blends with b) epoxides exhibit stable reactivity profiles. This "improved stability of the reactivity profile" means that factors such as, for example, variations in acidity of the isocyanate, do not significantly effect the reaction of polymethylene poly(phenylisocyanate) blends with an isocyanate-reactive compound. Accordingly, these mixtures make it possible to use a smaller quantity of catalyst in a polyurethane/urea formulation since the reactivity is higher. This, of course, reduces cost since less catalyst is required. In addition, the polyurethanes/ureas produced from these mixtures exhibit improved properties and longer service life.

DETAILED DESCRIPTION OF THE INVENTION

Figure 1:
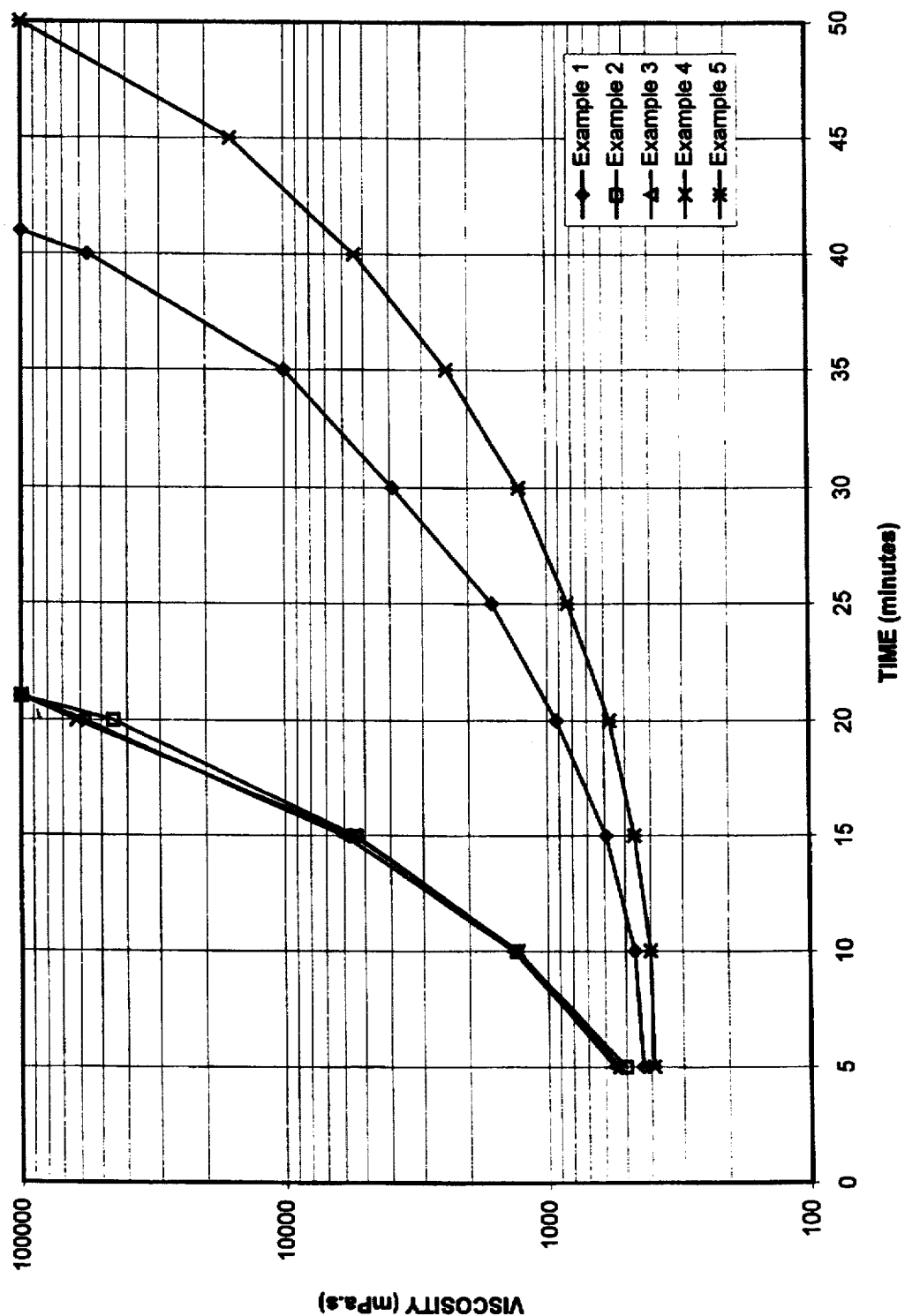
FIG. 1 is a graph showing a plot of the increases of viscosity of mixtures of polymethylene poly (phenylisocyanate) blends and epoxides, with a polyol for Examples 1, 2, 3, 4 and 5 versus time.

Suitable isocyanates for the presently claimed invention are polymethylene poly(phenylisocyanate) blends having a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the blend. The polymeric MDI content of these isocyanates varies from about 10 to about 70% by weight, preferably from about 30% to about 60% by weight.

Polymeric MDI as used herein, refers to the three-ring and/or higher ring products derived by the phosgenation of aniline-formaldehyde condensation products.

Preferred isocyanates include, for example, polymethylene poly(phenylisocyanate) blends having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the blend. This isocyanate blend comprises from about 50 to about 60% by weight of polymeric MDI.

Another preferred polymethylene poly(phenylisocyanate) blend has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the blend. This polyisocyanate blend comprises from about 20 to about 45% by weight of polymeric MDI.

Also suitable are mixtures of polyisocyanate blends as described above with adducts of MDI including, for example, allophanates of MDI as described in, for example, U.S. Pat. Nos. 5,319,053, 5,319,054 and 5,440,003, the disclosures of which are herein incorporated by reference, and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Any chemical compound which contains the epoxide (oxirane) functionality is suitable in the preparation of the mixtures of the present invention. The term "epoxide" or "epoxy" as used herein refers to any organic compound or resin comprising at least one group comprising a three membered oxirane ring. Preferably two or more oxirane groups are present in the epoxide compound or resin in order to obtain the polyisocyanate compositions with consistent reactivity profiles of the instant invention. The epoxide equivalent weight (EEVV) range of suitable epoxides is from about 44 to 400, preferably 100 to 350 and most preferably 150 to 300. Both aromatic and aliphatic polyepoxides may be used, and are well known.

It is somewhat less preferred that the epoxy comprises an aromatic polyepoxide due to the tendency of them to cause yellowing as well as their reduced efficacy. Examples of such aromatic polyepoxides include but are not limited to those selected from the group consisting of the polyglycidyl ethers of polyhydric phenols; glycidyl esters of aromatic carboxylic acids; N-glycidylaminoaromatics such as N-glycidylaminobenzene, N,N,N',N'-tetraglycidyl-4,4'-bis-aminophenyl methane, and diglycidylaminobenzene; glycidylamino-glycidyloxyaromatics such as glycidyl-aminoglycidyloxybenzene; and mixtures thereof.

The aromatic polyepoxide resins, comprised of the polyglycidylethers of polyhydric phenols including bis(phenol A), are also less preferred because they contain hydroxyl groups and thus, react with the polyisocyanate mixtures. Thus, this reduces the isocyanate content. Also, less preferred are aliphatic epoxides containing hydroxyl groups, e.g., glycidol, for the same reason. The preferred epoxides for use according to the invention are the aliphatic epoxides which do not contain hydroxyl groups.

Suitable for use are $C_2$–$C_{10}$ aliphatic epoxides such as, for example, ethylene oxide, propylene oxide, 1,2-butene oxide, 2,3-butene oxide (cis and/or trans), isobutylene oxide, 1,2-pentene oxide, 2,3-pentene oxide, cyclopentene oxide, 1,2-hexene oxide, cyclohexene oxide, and the like and mixtures thereof.

Examples of useful aliphatic polyepoxides include but are not limited to those selected from the group consisting of vinyl cyclohexene dioxide; butadiene dioxide; and those containing ether linkages such as triglycidyl isocyanurate, triglycidyl pentaerythritol, tetraglycidyl pentaerythritol, diglycidylethers of cylcohexane dimethanol and the diglycidylethers of other diols known to those skilled in the art, 1,4-bis(2,3-epoxypropoxy)benzene; 1,3-bis(2,3-epoxypropoxy)benzene; 4,4'-bis(2,3-epoxypropoxy) diphenyl ether; 1,8-bis(2,3-epoxypropoxy)octane; 1,4-bis(2,3-epoxypropoxy)cyclohexane; 4,4'-(2-hydroxy-3,4-epoxybutoxy)-diphenyl dimethyl methane; 1,3-bis(4,5-epoxypentoxy)-5-chlorobenzene; 1,4-bis(3,4-epoxybutoxy)-2-chlorocyclohexane; diglycidyl thioether; diglycidyl ether; 1,2,5,6-diepoxyhexane-3; 1,2,5,6-diepoxyhexane; those containing ester groups such as ERL 4221, a product of Union Carbide Corporation, illustrated in U.S. Pat. No. 4,814,103, the disclosure of which is herein incorporated by reference, and mixtures thereof.

Other useful epoxides are listed in, for example, U.S. Pat. No. 3,298,998, the disclosure of which is herein incorporated by reference. These compounds include but are not limited to those selected from the group consisting of bis[p-(2,3-epoxypropoxy)phenyl]cyclohexane; 2,2-bis[p-(2,3-epoxypropoxy)phenyl]norcamphane; 5,5-bis[(2,3-epoxypropoxy)phenyl]hexahydro-4,6-methanoindane; 2,2-bis[4-(2,3-epoxypropoxy)-3-methylphenyl]hexahydro-4,7-methanoindane; and 2-bis[p-2,3-epoxypropoxy) phenyl]-methylene-3methylnorcamphane; and mixtures thereof. Other usable epoxides are found in, for example, Handbook of Epoxy Resin, Lee and Neville, McGraw-Hill, N.Y. (1967) and U.S. Pat. No. 3,018,262, both of which are herein incorporated by reference.

Also, suitable epoxides for use in the present invention include the epoxidized dimer and trimer fatty acids, which are formed by epoxidizing the products of the polymerization of $C_{18}$ unsaturated fatty acids such as oleic acid, linoleic acid, linolenic acid, elaidic acid and the like. The use of a dimer or trimer fatty acid entity furnishes a higher molecular weight epoxide that is less likely to volatilize from the finished articles that the polyisocyanate compositions of the present invention are used to produce. The dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, monounsaturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred.

The mixtures of the present invention are prepared by mixing a) 90% to 99.5%, preferably 95% to 99% by weight, based on the combined weight of components a) and b), of polymethylene poly(phenylisocyanate) blend as described above; with b) 0.5% to 10%, preferably 1% to 5% by weight, based on the combined weight of components a) and b), of one or more epoxides having an epoxide equivalent weight of 44 to 400.

This invention also relates to a process for the production of polyurethanes/ureas comprising reacting a polyisocyanate component with an isocyanate-reactive component, the improvement wherein the polyisocyanate component comprises the mixture comprising a) 90% to 99.5%, preferably 95% to 99% by weight, based on the combined weight of components a) and b), of a polymethylene poly (phenylisocyanate) blend as described above; with b) 0.5% to 10%, preferably 1% to 5% by weight, based on the combined weight of components a) and b), of one or more epoxides having an epoxide equivalent weight of 44 to 400.

Suitable isocyanate-reactive components include those known in the field of polyurethane chemistry such as, for example, relatively high molecular weight (i.e., from about 500 to about 5000) polyether polyols, polyester polyols, polythioethers, polyacetals, amine-terminated polyethers, imines, polycarbonates, etc.; and relatively low molecular weight (i.e., 30 to 400) components which may contain hydroxyl and/or amine groups and/or other groups capable of reacting with an NCO group, including water. Low molecular weight components may be crosslinking agents, chain extenders, and/or chain terminators known to those skilled in the art of polyurethane chemistry.

The process of producing polyurethanes/ureas by reacting a polyisocyanate component with an isocyanate-reactive component typically occurs in the presence of one or more catalysts. Suitable catalysts include, for example, organometallic catalysts and tertiary amine compounds. The quantity of catalyst necessary is dependent on the acidity of the particular polyisocyanate component used in this process. As the acidity of the polyisocyanate increases, the reactivity of the polyisocyanate decreases. In other words, it takes longer for the reaction to occur unless additional catalyst is added. In order for the reaction to proceed within a specific time period consistently, it is usually necessary to increase or decrease the quantity of catalyst used to achieve constant reactivity profiles using blends of polyisocyanates with various acidity levels. By using the novel mixtures of polymethylene polyisocyanate blends with epoxides described above in the process of producing polyurethanes/ureas, it is possible to reduce the quantity of catalyst. The reactivity profiles of catalyzed formulations containing these isocyanate blends are significantly more stable, regardless of the acidity level of the polyisocyanate.

It is, of course, also possible that additives may be used in the process of producing polyurethanes/ureas. Suitable additives include, for example, surface-active additives such as emulsifiers and foam stabilizers, blowing agents, cell regulators, flame retarding agents, plasticizers, antioxidants, UV stabilizers, adhesion promoters, dyes, fillers and reinforcing agents such as glass in the form of fibers or flakes or carbon fibers, internal mold release agents, pigments, etc. Usually when pigments are added, they are dispersed in a hydroxyl group containing compound (such as, for example, a polyether, a polyester, or a chain extender). Any of the other known additives typically used in the field of polyurethane/urea chemistry may also be used.

The polyurethanes produced from the mixtures of this invention are suitable for use in areas such as, for example, various types of foams including flexible, semi-rigid, rigid and integral skin foams including reaction injection molding compounds, resin transfer molding compounds, elastomers, adhesives, binders, paints and coatings, etc.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples:

Isocyanate A

A 130 equivalent weight polymeric isocyanate mixture having an average functionality of about 2.4, and containing about 44% monomeric 4,4'-MDI, about 20% monomeric 2,4'- and 2,2'-MDI isomers, and about 36% higher molecular weight homologues of the MDI series. The viscosity of the mixture was about 40 mPa.s at room temperature and the acidity was 132 ppm.

Isocyanate B

A 131 equivalent weight polymeric isocyanate mixture having an average functionality of about 2.8, and containing about 40% monomeric 4,4'-MDI, about 3% monomeric 2,4'- and 2,2'-MDI isomers and about 57% higher molecular weight homologues of the MDI series. The viscosity of the mixture was about 200 mPa.s at room temperature and the acidity was 203 ppm.

Isocyanate C

Technical grade HCl gas was passed through, with agitation, a mixture of 45% of the monomeric 4,4'-isomer and 55% of the monomeric 2,2'- and 2,4'-isomers of diphenylmethane diisocyanate (MDI) for about 30 minutes. The resulting mixture had an acidity of 24,239 ppm (2.42%).

Isocyanate D

A mixture of Isocyanate A (98.81%) and Isocyanate C (1.119%). The resulting mixture had an acidity of 396 ppm.

Isocyanate E

A mixture of Isocyanate B (99.17%) and Isocyanate C (0.83%). The resulting mixture had an acidity of 403 ppm.

Polyol A

Castor Oil DB (from CasChem, Inc.), with 0.0175% dibutyltin dilaurate (Dabco Catalyst T12 from Air Products and Chemicals, Inc.), and having an equivalent weight of 342.

Polyol B

Castor Oil DB (from CasChem, Inc.), with 0.03% dibutyltin dilaurate (Dabco Catalyst T-12 from Air Products and Chemicals, Inc.), and having an equivalent weight of 342.

Epoxy A

An epoxidized linseed oil having an epoxide equivalent weight of about 180, commercially available as Epoxol 9-5 from American Chemical Service, Inc.

Experimental Procedure:

First, mixtures of various polymethylene poly(phenylisocyanate) components with Epoxy A were prepared by blending 100 parts of the respective isocyanates with the desired quantity of Epoxy A as set forth in Table A. Examples 1, 5, 10 and 12 did not contain any Epoxy A. These are control examples which are included to demonstrate the instability of the reactivity profile of polyisocyanates prior to mixing with an epoxide as required by the present invention.

Then, the necessary quantity of each mixture was added to 100 grams of a polyol component (i.e., an isocyanate-reactive component) to achieve an Isocyanate Index of 105, and mixed for 1 minute. After mixing, the jars were placed in a foam insulated 32 oz. can, and the temperature and viscosity were monitored until the viscosity reached 100,000 mPa.s. This provided a measure of useful pot life. Above this viscosity, the mixtures are no longer useful. Results are included in Tables 1-3. As further illustration of the results, the increase of viscosity vs. time is plotted in the accompanying figures.

TABLE A

| Isocyanate/Epoxy Mixtures | | |
|---|---|---|
| Example | Isocyanate | Epoxy A* |
| Mixture 1 | A | 0.0 |
| Mixture 2 | A | 1.0 |
| Mixture 3 | A | 3.0 |
| Mixture 4 | A | 5.0 |
| Mixture 5 | D | 0.0 |
| Mixture 6 | D | 1.0 |
| Mixture 7 | D | 2.0 |
| Mixture 8 | D | 3.0 |
| Mixture 9 | D | 5.0 |
| Mixture 10 | B | 0.0 |
| Mixture 11 | B | 3.0 |
| Mixture 12 | E | 0.0 |
| Mixture 13 | E | 3.0 |

*parts of epoxy per 100 parts of Isocyanate

The above mixtures of isocyanate blends with epoxy were used in the corresponding numbered examples below. More specifically, Mixtures 1, 2, 3, 4, 5, 6, 7, 8, 9, 10, 11, 12 and 13 (from Table A) were used in Examples 1, 2, 3, 4, 5, 6, 7, 8, 9, 10, 11, 12 and 13, respectively, in the amounts shown in Tables 1, 2 and 3 below.

TABLE 1

Viscosity Increases and Exotherms Over Time of a Polymeric MDI with a High 2,4'-MDI Monomer Content

| | Example 1 | Example 2 | Example 3 | Example 4 |
|---|---|---|---|---|
| Mixture # | 1 | 2 | 3 | 4 |
| (grams) | (40.2) | (40.6) | (41.4) | (42.2) |
| Polyol A (grams) | 100 | 100 | 100 | 100 |
| NCO/OH | 1.05 | 1.05 | 1.05 | 1.05 |

| Time (minutes) | Viscosity (mPa · s)/ Exotherm (°C.) | Viscosity (mPa · s)/ Exotherm (°C.) | Viscosity (mPa · s)/ Exotherm (°C.) | Viscosity (mPa · s)/ Exotherm (°C.) |
|---|---|---|---|---|
| 0 | —/23 | —/23 | —/23 | —/23 |
| 5 | 430/31 | 500/40 | 550/38 | 530/38 |
| 10 | 460/37 | 1,320/54 | 1,350/55 | 1,300/52 |
| 15 | 590/43 | 5,400/62 | 6,000/62 | 5,500/62 |
| 20 | 920/48 | 45,000/68 | 58,000/67 | 62,000/68 |
| 21 | —/— | 100,000/— | 100,000/— | 100,000/— |
| 25 | 1,620/53 | | | |
| 30 | 3,900/58 | | | |
| 35 | 10,100/61 | | | |
| 40 | 56,000/63 | | | |
| 41 | 100,000/63 | | | |

TABLE 2

Viscosity Increases and Exotherms Over Time of a Polymeric MDI with High 2,4'-MDI Monomer Content

|  | Example 5 | Example 6 | Example 7 | Example 8 | Example 9 |
|---|---|---|---|---|---|
| Mixture # (grams) | 5 (40.2) | 6 (40.6) | 7 (41.0) | 8 (41.4) | 9 (42.2) |
| Polyol A (grams) | 100 | 100 | 100 | 100 | 100 |
| NCO/OH | 1.05 | 1.05 | 1.05 | 1.05 | 1.05 |

| Time (minutes) | Viscosity (mPa · s)/ Exotherm (°C.) | Viscosity (mPa · s)/ Exotherm (°C.) | Viscosity (mPa · s)/ Exotherm (°C.) | Viscosity (mPa · s)/ Exotherm (°C.) | Viscosity (mPa · s)/ Exotherm (°C.) |
|---|---|---|---|---|---|
| 0 | —/23 | —/23 | —/23 | —/23 | —/23 |
| 5 | 390/28 | 470/35 | 520/38 | 510/40 | 530/36 |
| 10 | 400/33 | 840/47 | 1,170/51 | 1,300/55 | 1,130/50 |
| 15 | 460/37 | 1,850/53 | 4,100/59 | 5,800/63 | 4,060/60 |
| 20 | 570/42 | 4,890/60 | 18,000/66 | 60,000/67 | 23,000/65 |
| 21 | —/— | —/— | —/— | 100,000/67 | —/— |
| 22 | —/— | —/— | —/— |  | 100,000/67 |
| 23 | —/— | —/— | 100,000/67 |  |  |
| 25 | 830/45 | 20,000/64 |  |  |  |
| 29 | —/— | 100,000/66 |  |  |  |
| 30 | 1,270/49 |  |  |  |  |
| 35 | 2,400/55 |  |  |  |  |
| 40 | 5,400/57 |  |  |  |  |
| 45 | 15,900/60 |  |  |  |  |
| 50 | 100,000/63 |  |  |  |  |

TABLE 3

Viscosity Increase and Exotherms Over Time of a Polymeric MDI

|  | Example 10 | Example 11 | Example 12 | Example 13 |
|---|---|---|---|---|
| Mixture # (grams) | 10 (40.3) | 11 (41.5) | 12 (40.3) | 13 (41.5) |
| Polyol B (grams) | 100 | 100 | 100 | 100 |
| NCO/OH | 1.05 | 1.05 | 1.05 | 1.05 |

| Time (minutes) | Viscosity (mPa · s)/ Exotherm (°C.) | Viscosity (mPa · s)/ Exotherm (°C.) | Viscosity (mPa · s)/ Exotherm (°C.) | Viscosity (mPa · s)/ Exotherm (°C.) |
|---|---|---|---|---|
| 0 | —/23 | —/23 | —/23 | —/23 |
| 2 | 680/24 | 760/27 | 720/23 | 720/28 |
| 5 | 660/26 | 960/37 | 680/26 | 900/41 |
| 10 | 700/32 | 5,600/57 | 680/29 | 10,000/63 |
| 12 | —/— | 43,000/66 | —/— | 100,000/68 |
| 13 | —/— | 100,000/68 | —/— |  |
| 15 | 740/34 |  | 730/32 |  |
| 20 | 980/38 |  | 900/36 |  |
| 25 | 1,300/43 |  | 1,180/40 |  |
| 30 | 1,900/47 |  | 1,780/43 |  |
| 35 | 3,700/51 |  | 2,980/48 |  |
| 40 | 8,900/54 |  | 5,900/52 |  |
| 45 | 31,000/57 |  | 15,600/57 |  |
| 47 | 100,000/59 |  | —/— |  |
| 50 |  |  | 100,000/59 |  |

The color of all the Isocyanate/Epoxy mixtures in Examples 1 through 9 was greater than Gardner 18, the highest value on the Gardner color scale. The color of all the Isocyanate/Epoxy mixtures in Examples 10 through 13 were greater than Gardner 15. The examples of the instant invention herein all had somewhat grayer appearance than the somewhat reddish tint observed in all of the Gardner standards.

These results of the examples indicate that although there is no observable improvement in color, the reactivity of the polyisocyanate blends is enhanced and stabilized by the addition of a sufficient amount of the epoxide. That is, the blends all attain the same uniform and reproducible faster reaction rate, which is not dependent on the acidity level. The reactivity of the resulting mixtures containing epoxide is higher than the mixtures without epoxide so that less catalyst is necessary in formulations to subsequently form polyurethanes from them.

Figure 2:
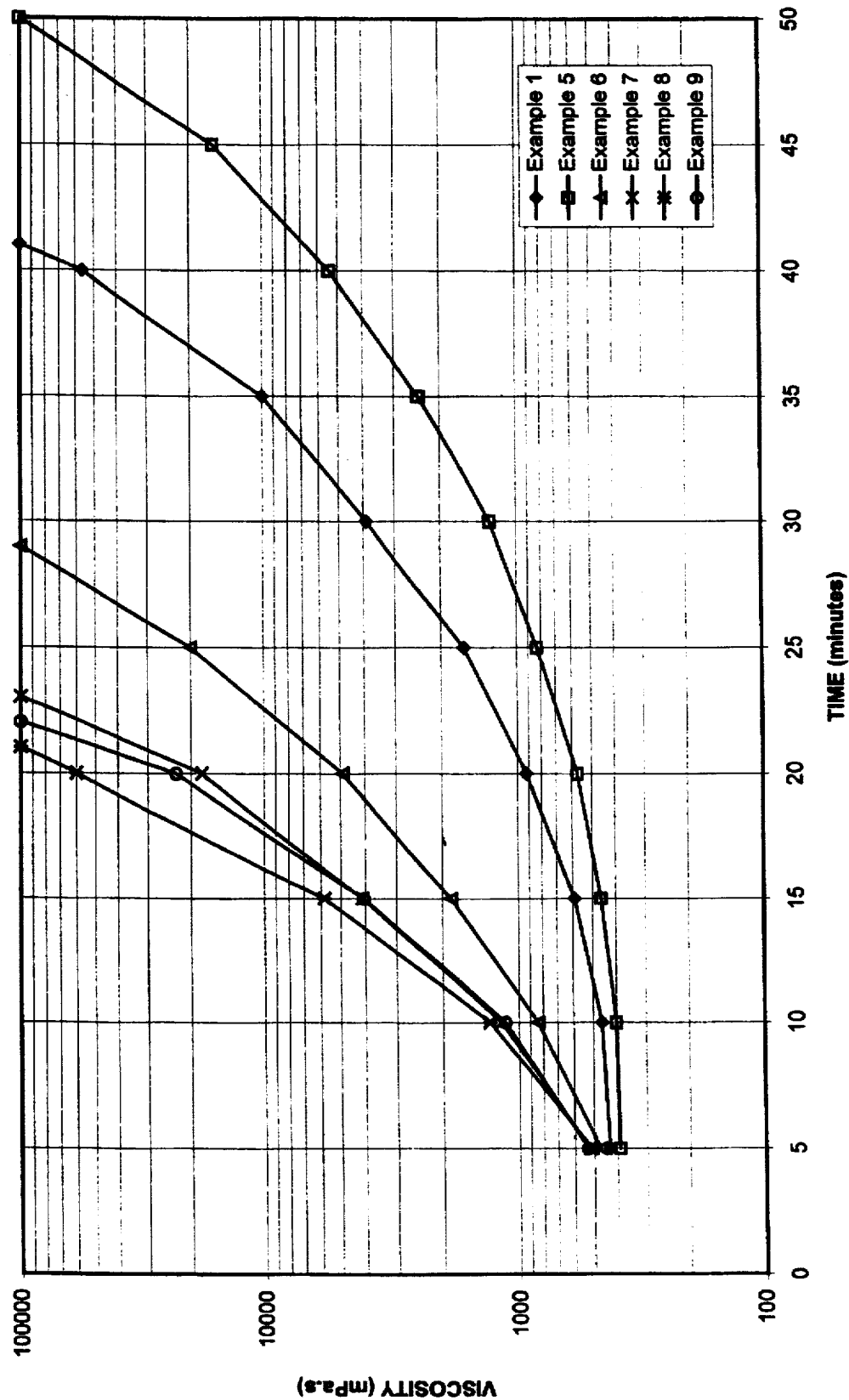
FIG. 2 is a graph showing a plot of the increases of viscosity of mixtures of polymethylene poly (phenylisocyanate) blends and epoxides, with a polyol for Examples 1, 5, 6, 7, 8 and 9 versus time.
Figure 3:
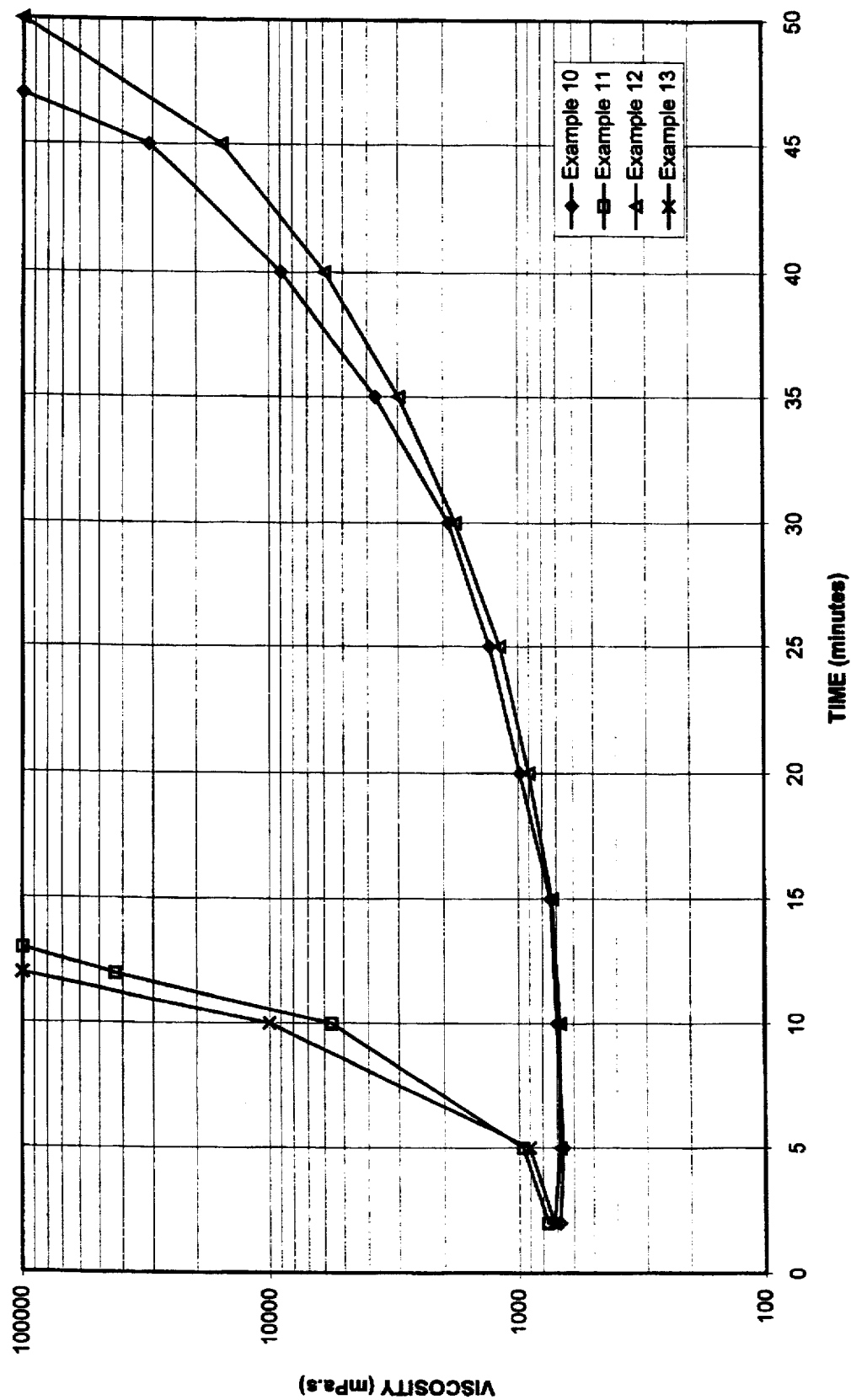
FIG. 3 is a graph showing a plot of the increases of viscosity of mixtures of polymethylene poly (phenylisocyanate) blends and epoxides, with a polyol for Examples 10, 11, 12 and 13 versus time.

FIGS. 1 through 3 are included to show graphically the increases of viscosity vs. time tabulated in Tables 1, 2 and 3. Examples 1 and 5 are included in both FIGS. 1 and 2 as controls. Comparing Example 5 to Example 1, one can see the effect of higher acidity on the reactivity of polymeric blends not containing the epoxy. Example 6 shows improvements obtained by adding epoxy. The stabilizing effect observed when a sufficient amount of epoxy is added to make all reactivities equal is shown in Examples 2, 3, 4, 7, 8 and 9. Likewise in FIG. 3, Examples 10 and 11 are included to demonstrate the effect of acidity and Examples 12 and 13 show the stabilizing effect of the epoxy additive on the reactivity of the polymeric MDI blends.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture comprising
   a) from 90 to 99% by weight, based on the combined weight of components a) and b), of a polymethylene poly(phenylisocyanate) blend having a functionality of about 2.1 to about 3.5, an NCO group content of from about 30% to about 33%, and a monomer content of from about 30% to about 90% by weight, wherein the content of the monomer comprises from up to about 5% by weight of the 2,2'-isomer, from about 1% to about 20% by weight of the 2,4'-isomer, and from about 25% to about 65% by weight of the 4,4'-isomer, based on the entire weight of the isocyanate blend;

and b) from 1.0 to 10% by weight, based on the combined weight of components a) and b), of an epoxide having an epoxide equivalent weight of from about 44 to about 400, said epoxide being selected from the group consisting of
   (i) epoxidized fatty acid monoglycerides,
   (ii) epoxidized fatty acid diglycerides,
   (iii) epoxidized fatty acid triglycerides,
   (iv) epoxidized dimer fatty acids,
   (v) epoxidized trimer fatty acids, and
   (vi) mixtures thereof.

2. The mixture of claim 1, wherein said epoxide has an epoxide equivalent weight of from about 100 to 350.

3. The mixture of claim 1, wherein said epoxide has an epoxide equivalent weight of from about 150 to 300.

4. The mixture of claim 1, wherein said epoxide is epoxidized linseed oil.

5. The mixture of claim 1, wherein said polymethylene poly(phenylisocyanate) blend has an average functionality of from about 2.5 to about 3.0, an NCO group content of about 30 to 32% by weight, and a monomer content of from about 40 to about 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the blend.

6. The mixture of claim 5, wherein said polymethylene poly(phenylisocyanate) blend has an average functionality of about 2.6 to about 2.8.

7. The mixture of claim 1, wherein said polymethylene poly(phenylisocyanate) blend has an average functionality of from about 2.2 to about 2.4, an NCO group content of from about 31.2 to about 32.8% by weight, and a monomer content of from about 55% to about 80% by weight, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the blend.

8. In a process for the production of a polyurethane/urea by the polyisocyanate polyaddition method of reacting a polyisocyanate component with an isocyanate-reactive component, the improvement wherein said polyisocyanate component comprises the mixture of claim 1.

9. The polyurethane/urea produced by the process of claim 8.

* * * * *